(12) United States Patent
Bedetti et al.

(10) Patent No.: US 10,184,844 B2
(45) Date of Patent: Jan. 22, 2019

(54) COMPACT HOME THERMOMETER

(71) Applicant: WITHINGS, Issy les Moulineaux (FR)

(72) Inventors: Thomas Bedetti, Paris (FR); Roger Yu, Neuilly-Plaisance (FR); Edouard Wautier, Paris (FR); Nadine Buard, Meudon (FR); Cédric Hutchings, Issy les Moulineaux (FR); Capucine Bodin, Paris (FR)

(73) Assignee: WITHINGS, Issy les Moulineaux (FR)

( * ) Notice: Subject to any disclaimer, the term of this patent is extended or adjusted under 35 U.S.C. 154(b) by 271 days.

(21) Appl. No.: 14/986,301

(22) Filed: Dec. 31, 2015

(65) Prior Publication Data

US 2017/0191880 A1    Jul. 6, 2017

(51) Int. Cl.
| | |
|---|---|
| *G01J 5/00* | (2006.01) |
| *G01K 1/00* | (2006.01) |
| *G01K 13/00* | (2006.01) |
| *G01J 5/02* | (2006.01) |
| *G01J 5/04* | (2006.01) |
| *G01J 5/08* | (2006.01) |

(52) U.S. Cl.
CPC ............ *G01K 13/004* (2013.01); *G01J 5/025* (2013.01); *G01J 5/026* (2013.01); *G01J 5/0265* (2013.01); *G01J 5/049* (2013.01); *G01J 5/0806* (2013.01); *G01J 5/089* (2013.01)

(58) Field of Classification Search
USPC .......................... 374/130, 121, 208; 600/474
See application file for complete search history.

(56) References Cited

U.S. PATENT DOCUMENTS

| | | | |
|---|---|---|---|
| 6,292,685 B1 | 9/2001 | Pompei | |
| 2002/0143257 A1* | 10/2002 | Newman | G01J 5/02 600/474 |
| 2009/0105605 A1* | 4/2009 | Abreu | A61B 5/0008 600/549 |
| 2009/0299682 A1* | 12/2009 | Yarden | G01K 1/16 702/131 |
| 2012/0215113 A1* | 8/2012 | Yarden | G01K 1/16 600/474 |
| 2017/0353684 A1* | 12/2017 | Wang | H04N 5/374 |
| 2017/0374261 A1* | 12/2017 | Teich | H04N 5/332 |

* cited by examiner

*Primary Examiner* — Mirellys Jagan
(74) *Attorney, Agent, or Firm* — Miller, Matthias & Hull LLP

(57) ABSTRACT

A thermometer device for temporal artery area measurement, configured to be used in a skin-touching stationary position, comprising an elongated body and a front portion having an end border arranged on a sensing plane (P), an array of N infrared sensors, with N greater than 8, a sensing region (SR) extending in the sensing plane over an area denoted SRA, at a distance denoted LF from a plane P2 containing the infrared sensors, the sensing region being encompassed within the border of the front end, an optical lens, interposed between the infrared sensors and the sensing region, to deviate light rays, wherein $LF^2 < K \times SRA$, with $K=3$.

15 Claims, 5 Drawing Sheets

COMPACT HOME THERMOMETER

FIELD OF THE INVENTION

The present invention concerns thermometer devices, in particular thermometers for measuring the body temperature of individuals. This kind of thermometer device may be used at home in a family environment. It can also be used in a medical environment.

BACKGROUND OF THE DISCLOSURE

It is widely known in the art that body core temperature can be acquired by auricular infrared thermometers which are adapted to be inserted into the patient's ear. However, various shortcomings are to be mentioned: even though a probe cover is provided, this method is often considered unhygienic, and the probe can be contaminated by dirt accumulated in the ear canal; further, it's not an easy method for a reluctant baby. Further, there may be some medical contra-indication, or the person may bear hearing aids.

More recently, it has been proposed to measure the temperature on the forehead area or on the temporal area, by sweeping a thermometer device across a certain distance, like taught by document U.S. Pat. No. 6,292,685 [Exergen]. The purpose of the sweeping (or scanning) process is to determine the peak temperature, which is supposed to correspond to the location of the temporal artery. However, it is difficult for the user to make a proper gesture, since the device has to be spaced a bit from the skin to allow cross movement. Therefore, the accuracy is not as good as expected. For some users, this method can be rather impractical, especially for self-measurements.

It is also to be noted that the known thermometer devices are rather bulky.

Therefore, there remains a need to bring new user-friendly solutions to perform fast and accurate body core temperature measurements. Additionally, there is also an interest to have a small device that can be stowed easily.

SUMMARY OF THE DISCLOSURE

According to a first aspect of the present invention, it is provided a thermometer device for temporal artery area measurement, configured to be used in a skin-touching stationary position, comprising:
- an elongated body and a front portion having an end border arranged on a sensing plane P,
- an array of at least N infrared sensors, with N greater than 8,
- a sensing region (SR) extending in the sensing plane over an area denoted SRA, at a distance denoted (LF) from a plane P2 containing the infrared sensors, the sensing region being encompassed within the border of the front end,
- an optical lens (3), interposed between the infrared sensors and the sensing region, wherein $LF^2 < K \times SRA$ with $K=3$.

The so-called dimensionless ratio K characterizes the compactness of the solution, it is thus made possible to sense a large sensing region with a low depth arrangement enabling a small overall size for the device. According to the proposed solution, the user has to simply apply the device onto the temporal region in contact with the skin, without having to move the device afterwards. The device then makes an audio/vibratory feedback to notify the end of the measurement. This process proves to be fast, practical and user-friendly; further, there is no sanitary issue in multi-users environment, The signals acquired from the matrix of N sensors are analyzed to locate the peak temperature which corresponds to the location of the temporal artery. Since the device is stationary during the measurement, the usability is improved and the measurement reliability is increased.

In various embodiments of the invention, one may possibly have recourse in addition to one and/or other of the following features or arrangements.
- the sensing plane extends over an area (SRA) which is at least 2 $cm^2$, preferably at least 3 $cm^2$, even more preferably at least 3.5 $cm^2$; This results in a good likelihood of encompassing the main temporal artery;
- the sensing region (SR) has a substantially square shape; This corresponds to a square-shape sensor arrangement which is standard and thus not expensive.
- the thermometer device may further comprise an actuation switch (8) and a display (9);

Whereby it is provided a convenient practical user interface;
- the thermometer device may further comprise a wireless interface (15); This enables a communication interface with a customized smartphone application and this allows management of several users profiles;
- the thermometer device may further comprise a removable protective cap (5); This provides a protection means for stowing and/or travel configuration;
- the body advantageously comprises one or more flattened portion (11, 12). This is a user friendly shape, which is easy to grasp and handle, and one of the flattened portion can advantageously houses a large fiat display;
- the overall length L3 of the thermometer device is less than 12 cm. It is a small overall length for a large sensing region;
- the front end has a cylindrical shape with an outer diameter D3 which is greater than 30 mm and the sensing region (SR) is circumscribed in a diameter D2 which is greater than 25 mm.

Such a general cylindrical shape is advantageous to decrease the overall footprint;
- Advantageously, the following geometric condition can be achieved: $L3 < 4 \times D3$; It proves to be a small overall length for a large sensing region;
- The following geometric condition can be achieved: $1 > D2/D3 > 0.9$; This results in an optimization of radial footprint compared to effective size of sensing region;
- the body is circumscribed in a cylinder C defined by a primitive defined by the external edge of the front end border and the axis X; Thereby, the device occupies a very small space and can be stowed very easily;
- the device can be put in a stable manner in an upright stable standing position on the front end. The device occupies a very small space standing on a shelf;
- the thermometer device may further comprise a PCB arrangement with a mother board (7) and a daughter board (70) arranged perpendicularly, the sensor array being soldered on the daughter board; This is a simple and optimized PCB architecture;
- the infrared sensors are thermopiles. Advantageously, thermopiles are efficient sensors for this kind of application, with low power consumption. The thermopiles advantageously collect lights ray on a rather broad spectrum encompassing rays from black body at 38° C.;

According to a second aspect of the present invention, it is provided a device and method to assess the vascular diffusion across the sensed region, in particular vasodilatation and vasoconstriction (i.e. skin vascularisation), by assessing a vasoconstriction index.

Therefore there is provided a method of using a thermometer device for temporal artery area measurement, configured to be used in a skin-touching stationary position, the thermometer device comprising an array of at least N infrared sensors, with N greater than 8, the method comprising:

performing a temperature measurement for each sensor, resulting in N values of skin temperature;

calculating a standard deviation on the set of N values of skin temperature; and inferring a vasoconstriction index from the standard deviation and possibly from the max-min difference in the set of N values of skin temperature.

Further, there is provided a correlation between the computed body core temperature and the vasoconstriction index.

In case of fever and substantial vasodilatation (high vascularisation index), this can mean a conventional fever condition or a toxic shock syndrome condition.

In case of fever and no substantial vasoconstriction (low vascularisation index), this can mean a momentary heart shortcoming or a stress condition.

In case of absence of fever and substantial vasodilatation, this reflects an emotion or the result of an intense physical effort.

Absence of fever and substantial vasoconstriction is the standard condition.

BRIEF DESCRIPTION OF THE DRAWINGS

Other features and advantages of the invention appear from the following detailed description of one of its embodiments, given by way of non-limiting example, and with reference to the accompanying drawings, in which.

DETAILED DESCRIPTION OF THE DISCLOSURE

In the figures, the same references denote identical or similar elements.

Figure 1:
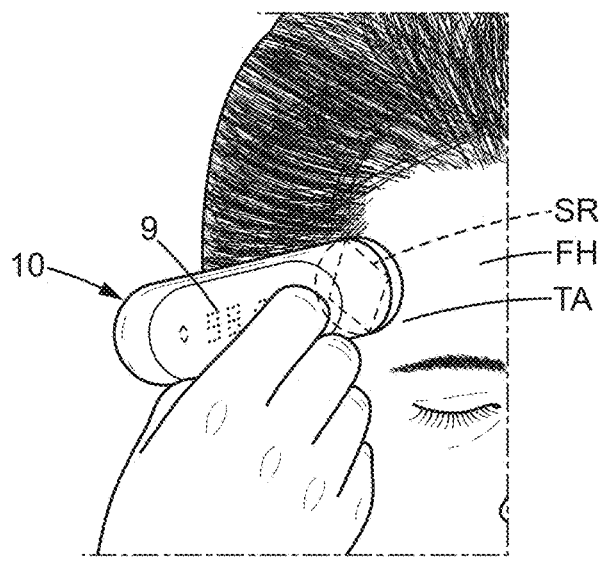
FIG. 1 shows an overview of the practical use of the thermometer device according to one embodiment of the present invention.

FIG. 1 shows an individual using a thermometer device 10 in accordance with an embodiment of the present invention. As shown in the illustrative example, the thermometer device 10 is applied to the temporal artery area TA, which is located at the side of the forehead area FH. The position of the thermometer device 10 defines a sensing region SR, which normally encompasses the path of the temporal artery.

The measurement is started by actuation of an actuation switch 8. Once the measurement and calculation are completed, the display 9 shows the resulting body core temperature (denoted BCT) which is readily available for the user for some seconds. Then, the device returns to its idle state.

The thermometer device 10 comprises an elongated body 1 and a front portion 4. The thermometer device 10 extends along an axial direction denoted X. The thermometer device 10 may be formed in a plastic housing; for example a two-part plastic housing, for example with a snap fit interface on the XY plane. The thermometer device 10 exhibits a general straight shape, by contrast to most existing products that are L-shape or gun-like.

The elongated body 1 includes a bottom flattened portion 12 and a top flattened portion 11 where the display 9 and the actuation switch 8 are disposed. A rounded backside 13 terminates the device at the axial end opposed to the front end side.

The front end 4 is cylindrical in the shown example, and is delimited by a front end border 6. Said front end border is planar and defines a sensing plane denoted P. When the thermometer device is in the measurement position as shown in FIG. 1, the sensing plane P encompasses and substantially coincides with the sensing region SR. The sensing plane P is perpendicular to the axial direction X.

In the illustrated example, the thermometer device 10 comprises an array of 16 infrared sensors 2. More generally, the thermometer device 10 can be provided with at least N infrared sensors 2, with N greater than 8 (or otherwise stated: 9 or more).

In the illustrated example, the infrared sensors are thermopiles. Other types of infrared sensor are not excluded.

The infrared sensors 2 are preferably arranged in a sensor assembly 20.

The infrared sensors 2 are situated in a plane denoted P2. The infrared sensors 2 are preferably thermopiles which collect light rays on a rather broad spectrum encompassing rays from black body at 38° C.

There is further provided an optical lens 3 at the front side of the sensor assembly 20.

The optical lens 3 deviates the light rays such that the sensing region SR is very much enlarged compared to the actual area of the sensor assembly itself.

Inside the front portion 4, there is provided a frusto-conical recess 40 in which the useful infrared light rays take place.

Figure 3:
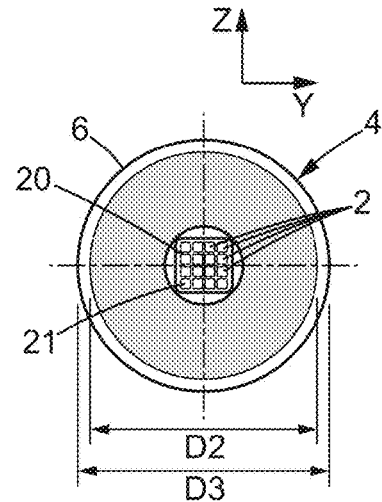
FIG. 3 illustrates a front-end view of the thermometer device.
Figure 2:
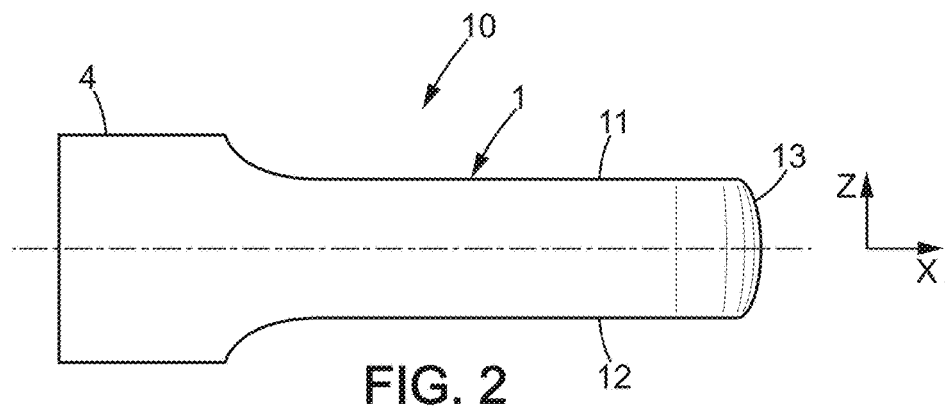
FIG. 2 illustrates a side view of the thermometer device.
Figure 4:
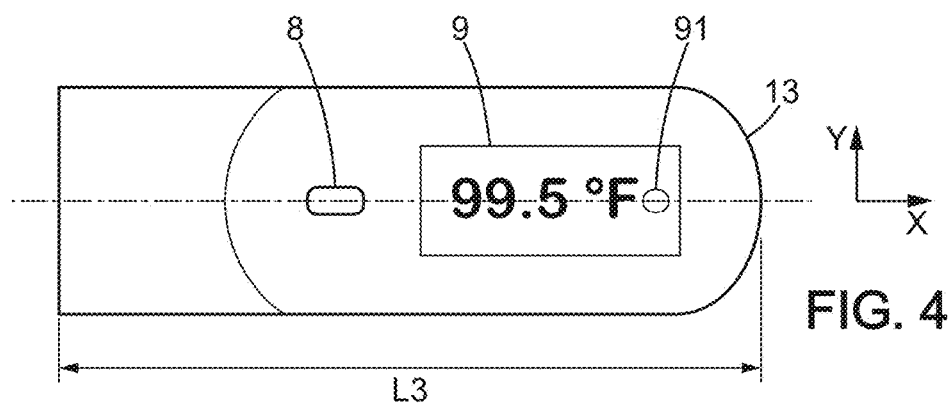
FIG. 4 shows a top view of the thermometer device.
Figure 5:
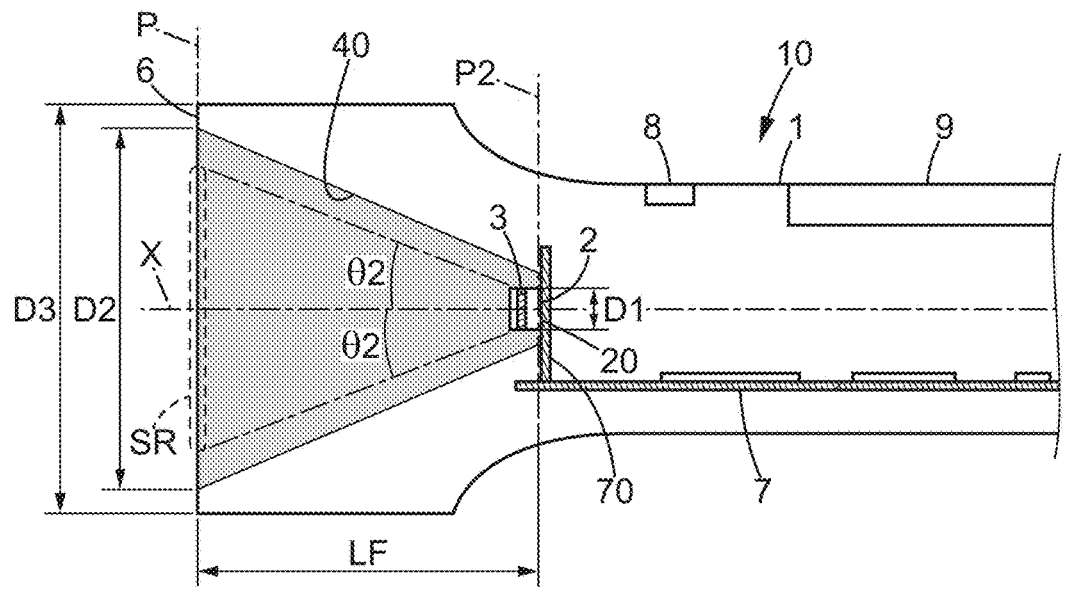
FIG. 5 illustrates an axial sectional view of the thermometer device, along section line V-V shown at FIG. 7.
Figure 7:
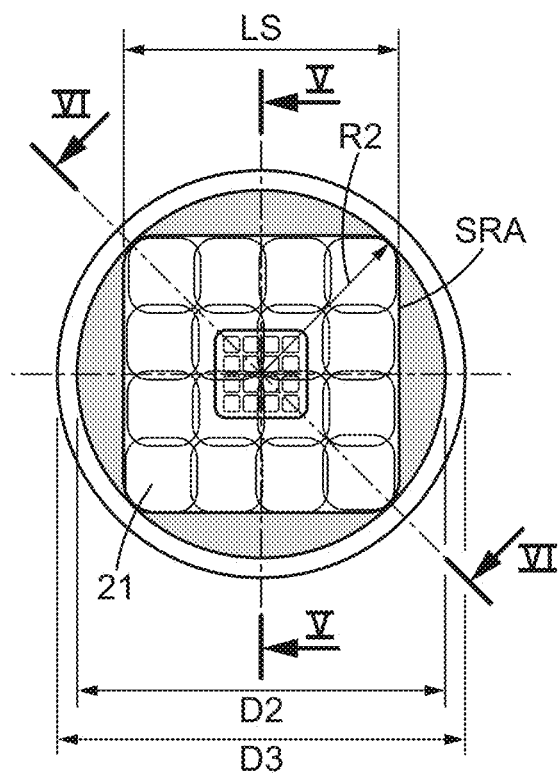
FIG. 7 illustrates a schematic front-end view of the thermometer device.
Figure 8A:
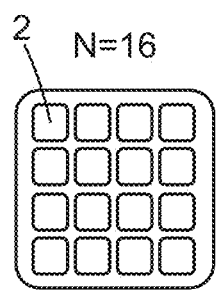
FIGS. 8A,8B,8C illustrate variants of the array of infrared sensors.

In the illustrated example shown here (see FIGS. 3, 7, 8A), the infrared sensors 2 are arranged in a square 4×4 matrix configuration. Therefore, the sensing region SR is also a square 4×4 matrix configuration as shown in FIG. 7.

The sensing region (SR) extends in the sensing plane over an area denoted SRA.

The overall length L3 along the axial direction is generally less than 150 mm, and in the illustrated example is less than 120 mm.

The overall diameter D3 of the thermometer device is in the illustrated example 33 mm. However a preferred range for D3 is [25 mm-35 mm].

Advantageously, the following geometric condition can be achieved: L3<4×D3.

The frusto-conical recess 40 has a front border with an internal diameter denoted D2. In the illustrated example D2 is 28.4 mm. However a preferred range for D2 is [22 mm-30 mm].

Advantageously, the relation 1>D2/D3>0.9 is satisfied to optimize the radial footprint compared to effective size of sensing region SR.

Figure 6:
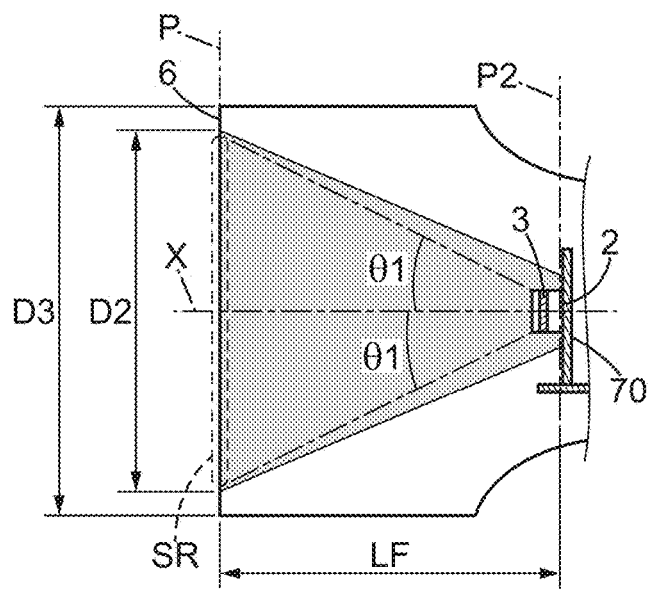
FIG. 6 illustrates another partial axial sectional view of the thermometer device, along section line VI-VI shown at FIG. 7.

SR is circumscribed in the internal diameter D2 (see FIGS. 6, 7).

The distance denoted LF is the distance from the sensor plane P2 containing the infrared sensors, to the sensing plane P.

Advantageously, the design is such that $LF^2 < K \times SRA$, with K=3.

To avoid any ambiguity, $LF^2$ is the quantity LF squared, i.e. LF×LF.

LF represents a pseudo focal depth. K represents a dimensionless compactness ratio.

More precisely, in the illustrated example, the distance LF is equal to 33.5 mm.

R2 (see FIG. 7) is equal to 14.2 mm. LS which denotes the length of the side of the squared sensor arrangement is equal to 20 mm.

The sensing region area SRA is equal to 400 mm$^2$; i.e. 4 cm$^2$.

More generally, the inventors have found that sensing region area SRA should be at least 2 cm$^2$, preferably at least 3 cm$^2$, even more preferably at least 3.5 cm$^2$.

If we calculate the compactness ratio K in this particular exemplary case, we find K0=2, 8.

In the shown example, we note a maximum angular deviation θ1 for the most off-center offset sensing position is Arctan (D2/2−D1/2)/LF, which is here 23°. R2=D2/2.

The maximum angular deviation θ2 in the YX or ZX plane is around 17°.

The thermometer device 10 further comprises a battery 18 and a vibrator 19.

The thermometer device 10 further comprises a wireless interface 15, to exchange data with a personal electronic device such as a smartphone 50. The smartphone is provided with a comprehensive application which connects to the thermometer device.

The thermometer device 10 can be operated in local mode, i.e. without communication or connection to the smartphone. Several measurements can be made and the results can be stored locally, and then transmitted to a remote apparatus, smartphone, or cloud server.

The thermometer device 10 can be operated in a connected mode, in this case the selection of one individual among the family members can be done via a smartphone application.

The sensor assembly 20 has a rather small size; in the shown example D1=8 mm.

Figure 8B:
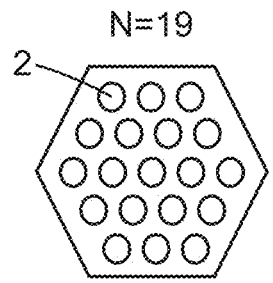
Figure 8C:
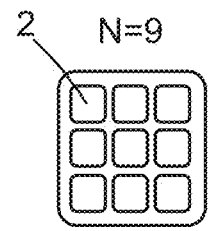

The sensor assembly 20 can exhibit other shapes than the square, like that illustrated in FIG. 8B which shows a honeycomb, hexagonal structure with staggered rows, and in FIG. 8C, which shows a 3×3 matrix configuration.

The lens 3 may be integrated in an integrated sensor module together with the sensor assembly 20.

The lens 3 is close to the sensor front surface. The lens 3 has a either a flat/convex or a bi-convex shape. Although, other configurations, with two lenses or different shapes of lens, are not excluded.

The location of the sensors 2 corresponds to the optical focus of the lens arrangement with regard to the sensed region (considered far away optically).

Figures 9A, 9B:
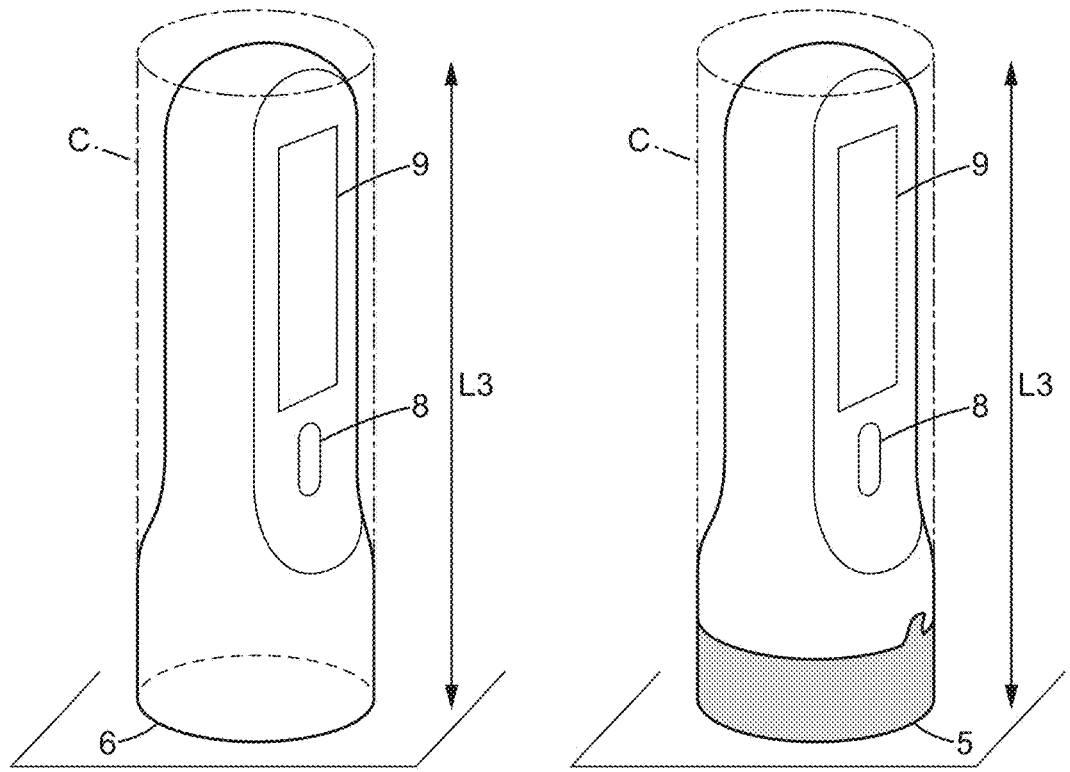
FIG. 9A shows the thermometer device in a stable upright position, standing on its front end.
FIG. 9B is similar to FIG. 9A with an additional protective front-end cover.
Figure 10:
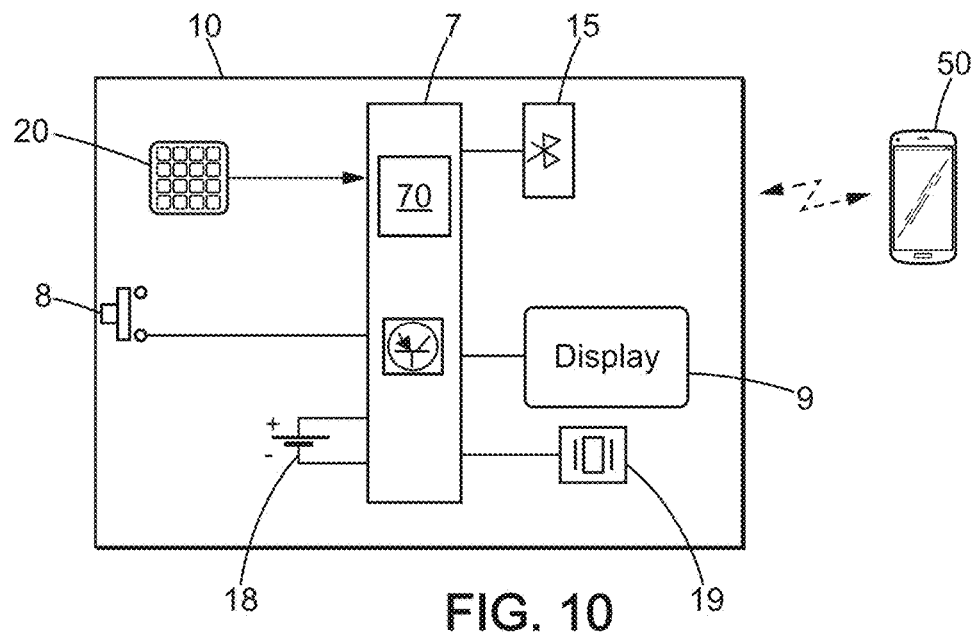
FIG. 10 shows an electrical diagram of the thermometer device.

As illustrated in FIGS. 9A-9B, the thermometer device can be placed in an upright position, for example standing on a shelf in the bathroom. The body is circumscribed in a cylinder C defined by a perimeter defined by the external edge of the front end border 6 and the axis X.

The device can be put in a stable manner in an upright stable standing position on the front end. One can understand that the thermometer device occupies a very small place in this position. Also, it has the advantage of protecting the front end 4 from mechanical damage.

The thermometer device can be placed in such a position with its protective cap 5 or without its protective cap. The protective cap 5 is made in elastomeric material.

Due to its straight shape, the thermometer device can also be brought easily in a travel handbag.

There can be provided a protection sleeve (not shown) and/or a travel case (not shown) in which the device 10 can be put.

Advantageously, the thermometer device 10 can be used in self measurement or with a patient and a carer or with a parent and a child/baby.

The 16 sensors 2 are denoted 21, 22, 23, 24, 25, 26, 27, 28, 29, 2A, 2B, 2C, 2D, 2E, 2F, and 2G.

On the display 9, there is provided a dot matrix portion in which the body core temperature is displayed either in Celsius unit ° C. or in Fahrenheit unit ° F.

Additionally, there may be provided a tactile surface to form user input. With this kind of interface, the user can select one individual among the family members can be displayed as a list.

It is to be noted that a customized related smartphone application can also be used to identify the relevant family member. For each family member, there is provided a personal profile, a history of measurements with curves and comments.

Advantageously, the time required for measurement taken from the activation on the switch 8 to the effective display of the body core temperature BCT is less than two seconds.

Additionally, there is provided an indicative Led 91, which can show different colors: for example green for no fever, yellow for light fever, orange for fever, red for high fever.

Regarding now the internal electronic design, there is provided a PCB arrangement with a mother printed circuit board 7 and the daughter board 70.

Advantageously, the daughter board 70 is plugged in a perpendicular position with regard to the plane of the motherboard 7. The sensor assembly is soldered directly on the surface of the daughter board 70.

Each of the 16 sensors 21, 22, 23, 24, 25, 26, 27, 28, 29, 2A, 2B, 2C, 2D, 2E, 2F, 2G, gives a corresponding measurement, respectively denoted MT1, MT2, . . . MTG.

Figure 12:
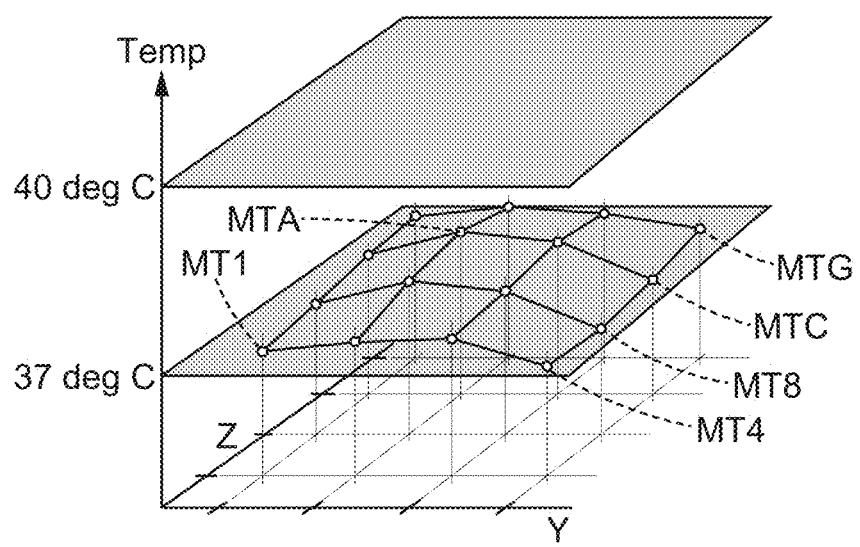
FIG. 12 shows an occurrence of an exemplary temperature cartography resulting from a temperature measurement.

As shown at FIG. 12, this can be represented in a three-dimensional cartography, the vertical axis corresponding to the measured temperature.

The body core temperature BCT is inferred from the maximum value, here MTA, which corresponds substantially to the temporal artery 81.

More generally, the measurements give N values of temperature MT(i) with I is ranging from 1 to N.

The process of calculation identifies the maximum value generally denoted $MT(i_m)$.

Practically, the control unit on the PCB 7 performs several corrections, taking into account the room temperature, the maximum measured temperature value, and a function of all other measured temperature.

According to one embodiment, BCT=F1 ($MT(i_m)$)

F1 is designed to take into account the ambient air temperature and the device internal temperature as well. F1 can be seen as a correction function. F1 can be based on analytical formulas or on a lookup table.

Optionally, this calculation can be further refined using:

$$BCT = F1(MT(i_m)) + F2[(MT(1), MT(2), \ldots MT(i) \ldots MT(N)]$$

to take into account the level of vascularization of the sensed region.)

F2 is designed to take into account the level of blood vascularization. F2 can be seen as a second, auxiliary correction function. F2 can be based on analytical formulas or on a lookup table.

The standard deviation SD of the set points of measured temperature is also computed.

The standard deviation SD gives an image of the skin blood diffusion/perfusion, which is called in the present specification "skin vascularisation index".

The skin vascularisation index reflects the level of blood diffusion in vessels.

Figure 11:
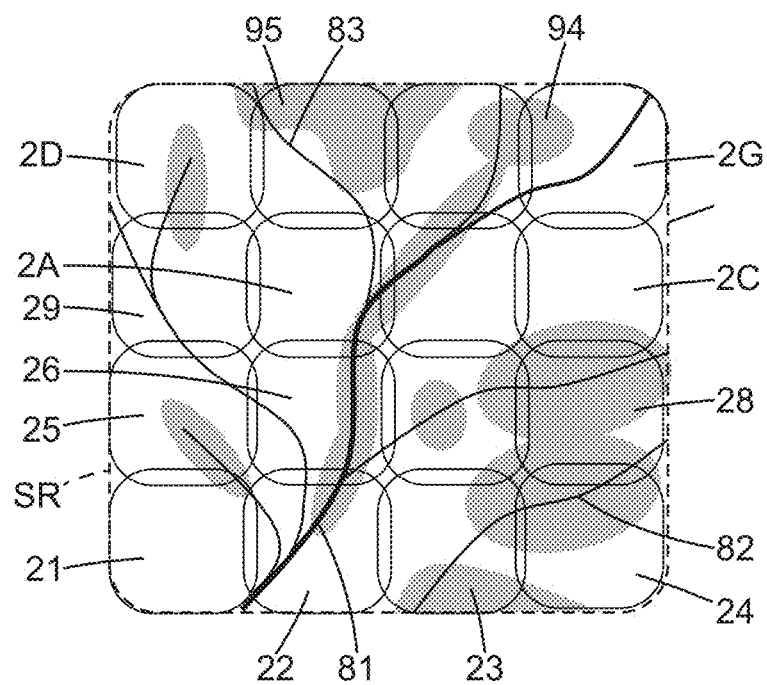
FIG. 11 illustrates schematically the sensed region.

In case of vasodilatation, many or all the small blood vessels 82, 83 are expanded, and this gives several areas of warm condition (see references 94, 95, 28 on FIG. 11), a low SD value that we can interpret as a high skin vascularisation index.

In case of vasoconstriction, many or all the small blood vessels are shrunk, and this gives very few areas of warm condition, with regard to the mains vessels 81, 82, 83 which are warmer, therefore a high SD value that we can interpret as a low skin vascularisation index.

The invention claimed is:

1. A thermometer device for temporal artery area measurement, configured to be used in a skin-touching stationary position, comprising;
    an elongated body and a front portion having an end border arranged on a sensing plane (P),
    an array of at least N infra-red sensors, housed within the body and situated in a plane P2, with N greater than 8,
    a sensing region (SR) extending in the sensing plane over a sensing region area denoted SRA, at a distance denoted LF from the plane P2, the sensing region being encompassed within the end border of the front portion,
    at least an optical lens, interposed between the array of infra-red sensors and the sensing region (SR), to deviate light rays such that the sensing region is larger than the array of infra-red sensors,
    wherein $LF^2 < K \times SRA$, with K=3.

2. The device of claim 1, wherein the sensing plane extends over a sensing region area SRA that is at least 2 cm².

3. The device of claim 1, wherein the sensing region (SR) has a substantially square shape.

4. The device of claim 1, further comprising an actuation switch arranged on the body and a display, arranged on the body.

5. The device of claim 1, further comprising a wireless communication interface.

6. The device of claim 1, further comprising a removable protective cap configured to cover at least the array of infra-red sensors.

7. The device of claim 1, wherein the body comprises one or more flattened portions.

8. The device of claim 1, wherein the front portion has a cylindrical shape with an outer diameter D3 and wherein the thermometer device has an overall length L3 which is less than 4×D3.

9. The device according to claim 1, wherein the thermometer device has an overall length L3 which is less than 12 cm.

10. The device of claim 1, wherein the body is circumscribed in a cylinder C defined by a perimeter defined by the external edge of the end border of the front portion and the axis X.

11. The device of claim 1, characterized in that the device can be put in a stable manner in an upright stable standing position on the front portion.

12. The device of claim 1, which comprises a PCB arrangement with a mother board and a daughter board arranged perpendicularly, the array of at least N infra-red sensors being soldered on the daughter board.

13. The device of claim 1, wherein the infra-red sensors are thermopiles.

14. The device of claim 1, wherein the front portion has a cylindrical shape with an outer diameter D3 which is greater than 30 mm and the sensing region (SR) is circumscribed in a diameter D2 which is greater than 25 mm.

15. The device of claim 14, wherein 1>D2/D3>0.9.

* * * * *